(12) United States Patent
Hukkanen

(10) Patent No.: US 7,711,823 B2
(45) Date of Patent: May 4, 2010

(54) SYSTEM FOR ESTABLISHING AND MAINTAINING A CONNECTION

(75) Inventor: Vesa Juhani Hukkanen, Oulu (FI)

(73) Assignee: eBay Inc., San Jose, CA (US)

( * ) Notice: Subject to any disclaimer, the term of this patent is extended or adjusted under 35 U.S.C. 154(b) by 1231 days.

(21) Appl. No.: 10/468,353

(22) PCT Filed: Feb. 18, 2002

(86) PCT No.: PCT/FI02/00133

§ 371 (c)(1),
(2), (4) Date: Aug. 18, 2003

(87) PCT Pub. No.: WO02/073892

PCT Pub. Date: Sep. 19, 2002

(65) Prior Publication Data

US 2004/0105428 A1    Jun. 3, 2004

(30) Foreign Application Priority Data

Feb. 16, 2001    (FI) .................................. 20010297

(51) Int. Cl.
*G06F 15/16*    (2006.01)
*H04W 36/00*    (2009.01)
(52) U.S. Cl. ...................... 709/227; 455/440
(58) Field of Classification Search .................. 709/227; 455/440, 438
See application file for complete search history.

(56) References Cited

U.S. PATENT DOCUMENTS

| | | | | |
|---|---|---|---|---|
| 4,613,990 A | * | 9/1986 | Halpern | 455/436 |
| 5,351,290 A | * | 9/1994 | Naeini et al. | 379/189 |
| 5,841,469 A | * | 11/1998 | Freeman et al. | 379/114.15 |
| 5,862,481 A | * | 1/1999 | Kulkarni et al. | 455/432.2 |
| 6,181,935 B1 | * | 1/2001 | Gossman et al. | 455/432.2 |
| 6,560,216 B1 | * | 5/2003 | McNiff et al. | 370/349 |
| 6,633,761 B1 | * | 10/2003 | Singhal et al. | 455/436 |

(Continued)

FOREIGN PATENT DOCUMENTS

EP    1 011 278    6/2000

(Continued)

OTHER PUBLICATIONS

Handley, et al. RFC 2543: Session Initiation Protocol. IETF Mar. 1999.*

*Primary Examiner*—Larry Donaghue
(74) *Attorney, Agent, or Firm*—Schwegman, Lundberg & Woessner, P.A.

(57) ABSTRACT

An arrangement and method for establishing and maintaining a connection between users' communication devices via a public data network. Communication devices belonging to users of a system are terminals of a telecommunication network, say mobile phones, and, in addition, they are adapted to a link to a data network via a wireless transfer system. Interfaced with the data network there is at least one server that keeps a register of communication devices. A communication device brought near a data network terminal reports itself to the server using a device-specific identifier. This reporting message also contains network address of the terminal. When a connect request arrives from a communication device via a terminal, the server provides for necessary network connection if the called device specified in the connect request can be reached.

22 Claims, 7 Drawing Sheets

U.S. PATENT DOCUMENTS

| | | | |
|---|---|---|---|
| 6,857,021 B1 * | 2/2005 | Schuster et al. | 709/227 |
| 6,990,082 B1 * | 1/2006 | Zehavi et al. | 455/419 |
| 2008/0104254 A1 | 5/2008 | Hukkanen et al. | |

FOREIGN PATENT DOCUMENTS

| | | |
|---|---|---|
| EP | 1011279 A2 | 6/2000 |
| WO | WO 99/48312 | 9/1999 |
| WO | WO 01/03392 | 1/2001 |
| WO | WO 01/65821 | 9/2001 |
| WO | WO 01/67684 | 9/2001 |

* cited by examiner

SYSTEM FOR ESTABLISHING AND MAINTAINING A CONNECTION

The invention relates to an arrangement for establishing and maintaining a connection between users' communication devices via a public data network. The invention further relates to a method for establishing and maintaining a connection between users' communication devices via a public data network.

BACKGROUND OF THE INVENTION

For a long time now the infrastructure represented by telecommunication networks has been growing rapidly while at the same time these networks have become more versatile and technologically more advanced. The old fixed analog telephone network has been replaced by a digital one. Mobile networks have been set up to complement the fixed telephone network, enabling the use of wireless terminals with little geographical limitations. On the other hand, separate data networks have been built. These include a great number of local area networks (LAN) of private nature, and a plurality of public data networks. The most important of the public data networks is the global Internet through which a vast number of servers and other sites can be reached. One of the factors that make it so tempting to use the Internet for a variety of data transfer purposes, such as to transfer voice and picture signals, is that it is so inexpensive, i.e. the cost payable by the user per amount of data transferred is relatively small.

At the core of the so-called system architecture of the Internet there is a protocol pair called the TCP/IP (Transmission Control Protocol/Internet Protocol). Transmission session is controlled at the transfer end points according to the TCP, and TCP data frames are fragmented into smaller "packets" and these packets are then routed through the network according to the IP. Routing is generally based on network addresses of terminals, these addresses being global IP addresses in the case of the Internet. On the basis of a plain-text receiver address given by the user, the sending terminal is able to get a corresponding IP address from a server set up especially for this purpose and to attach that IP address to the data packets to be sent. If the recipient is at a usual location such as home or office, no problems usually occur with the transfer. The situation becomes more complicated if the recipient is moving. Even if he were close to a machine interfaced with the Internet, the transfer could not be completed if the sender did not know the network address for the machine in question. The sender cannot even know whether the recipient can be reached or not. It is conceivable that the sender first calls the recipient on his mobile phone to inquire about this, but this is a clumsy way and, moreover, incurs phone costs. Furthermore, the recipient's mobile phone may be switched off or the recipient may not have a mobile phone to begin with.

Publication WO 9816045 discloses a system which alleviates the problem mentioned above. FIG. 1 illustrates the overall structure of the system. It includes a server 120 interfaced with a data network 110 such as the Internet, and terminals, normally computers, interfaced with that same network. FIG. 1 shows two terminal computers DTA and DTB. A system user reports to the server at a terminal computer. A registration message contains the network address of the terminal computer in question and the password and personal identifier entered by the user. The server responds by sending a list of persons who at that moment can be reached so-called "OnLine". The list only includes persons belonging to a group defined by the user. In FIG. 1, a user, person A, is sitting at terminal computer DTA, and a user, or person B, is sitting at terminal computer DTB. If person A wants to contact person B, he sends a message from terminal computer DTA to the server 120, which message contains the name of person B. If person B can be reached, the server responds by sending to terminal computer DTA, via a route 111, the network address ADB of terminal computer DTB. In addition, the server sends to terminal computer DTB, via a route 112, the network address ADA of terminal computer DTA and the name of person A. After that, persons A and B can begin to communicate via a route 113, where the server is no longer needed. A person who has joined this kind of a service may also reserve a right to restrict the distribution of his address information. In that case the server that received a connection request for such a person first asks the person in question whether the requester can be sent information about whether the person can be reached. The person can then either allow or deny the sending of that information.

So the idea of the system disclosed in publication WO 9816045 is to make it easier for persons belonging to the same circle of acquaintances, for example, to establish connections between them. To that end, the server keeps a register for the group associations, personal data and online traffic data of the persons subscribing to the service. A drawback of the system is that a user must himself start, at the terminal computer, a software application according to the system and enter his personal identifier so as to register in on the server. Moreover, the user must actively observe his computer so as to be able to respond to a connection request. Another drawback is that communication is limited to the exchange of text messages and files, and the user is tied to the terminal computer for the duration of the connection.

Publication WO 0165821 discloses a system employing a data network, involving portable devices such as laptop computers in the vicinity of network terminals. A portable device is equipped with a small-range radio device and software required by the system in question. The portable device repeatedly sends out a reporting message. When it comes close to a data network terminal, the latter detects the reporting message and sends to a data network server a registration request containing user-specific information that was included in the reporting message. This way the user's device is linked to the network. The system does not include any special connection establishing service.

SUMMARY OF THE INVENTION

An object of the invention is to eliminate the above-mentioned drawbacks associated with the prior art and implement a network connection in a manner that enables more versatile use of-the connection.

The basic idea of the invention is as follows: communication devices belonging to users of a system are terminals of a telecommunication network, say, mobile phones. The communication devices are provided with a facility to link to a data network such as the Internet. To that end, there is a transfer system between the communication devices and data network terminals, and an application program at the communication device and terminal, which program utilizes the transfer system. At least one server, maintaining a communication device register, is interfaced with the data network. A communication device near a data network terminal reports itself to the terminal through said transfer system. The terminal then sends to the server a message indicating the identifier of the reported communication device and the terminal's network address. The server arranges all entries in a register. When through a terminal arrives a connection request sent by the communication device, the server checks in the register whether the called device mentioned in the connection request can be reached or not. In a favourable case, the server sends the network address of the terminal linked to the called device to the terminal linked to the calling device, and the network address of the terminal linked to the calling device to the terminal linked to the called device. Alternatively, the server sends a network address to only one of the terminals, which then sends its own network address to the terminal which has the network address sent by the server. The called device receives an alert message from the terminal. When the called device has responded, a connection is established between it and the calling device through the data network and wireless transfer systems at both ends. The connection may be a speech connection, for instance. The server also draws conclusions about the relative locations of the terminals. Based on such mapping the server, if possible, makes a handover from a terminal along the connection route if a communication device moves during a connection so that the quality of the connection between the device and the terminal significantly decreases. If a new connection through the data network that would be good enough cannot be found or if the quality of the data network connection for some internal reason becomes poor, a connection can be established between the communication devices through the telecommunication network, the terminals of which the communication devices are, without terminating the speech connection, for example. The telecommunication network in question can also be utilized in establishing a connection via the data network.

A general advantage of the invention is that it widens communication chances using fairly ordinary commercial communication devices. One practical advantage is that a communication device can be registered at a data network server automatically as soon as the communication device appears in the vicinity of a terminal according to the invention. So, registration usually requires no action from the user of the communication device. Another advantage of the invention is that the communication device will also alert for a call coming via the data network so that the user need not actively monitor the communication device. A further advantage of the invention is that the user is able, to a certain extent, to move about during a connection, thereby not being tied to a fixed terminal. This is based on the system's ability to hand over the connection to another terminal when necessary. A yet further advantage of the invention is that when the communication device is a phone, the Internet can be used also in the transfer of speech signals, thereby significantly reducing phone costs. This also applies to the transfer of music files and live pictures with associated data if the communication devices have video facilities.

BRIEF DESCRIPTION OF THE DRAWINGS

The invention is below described in detail. Reference is made to the accompanying drawings in which.

DETAILED DESCRIPTION OF THE INVENTION

Figure 1:
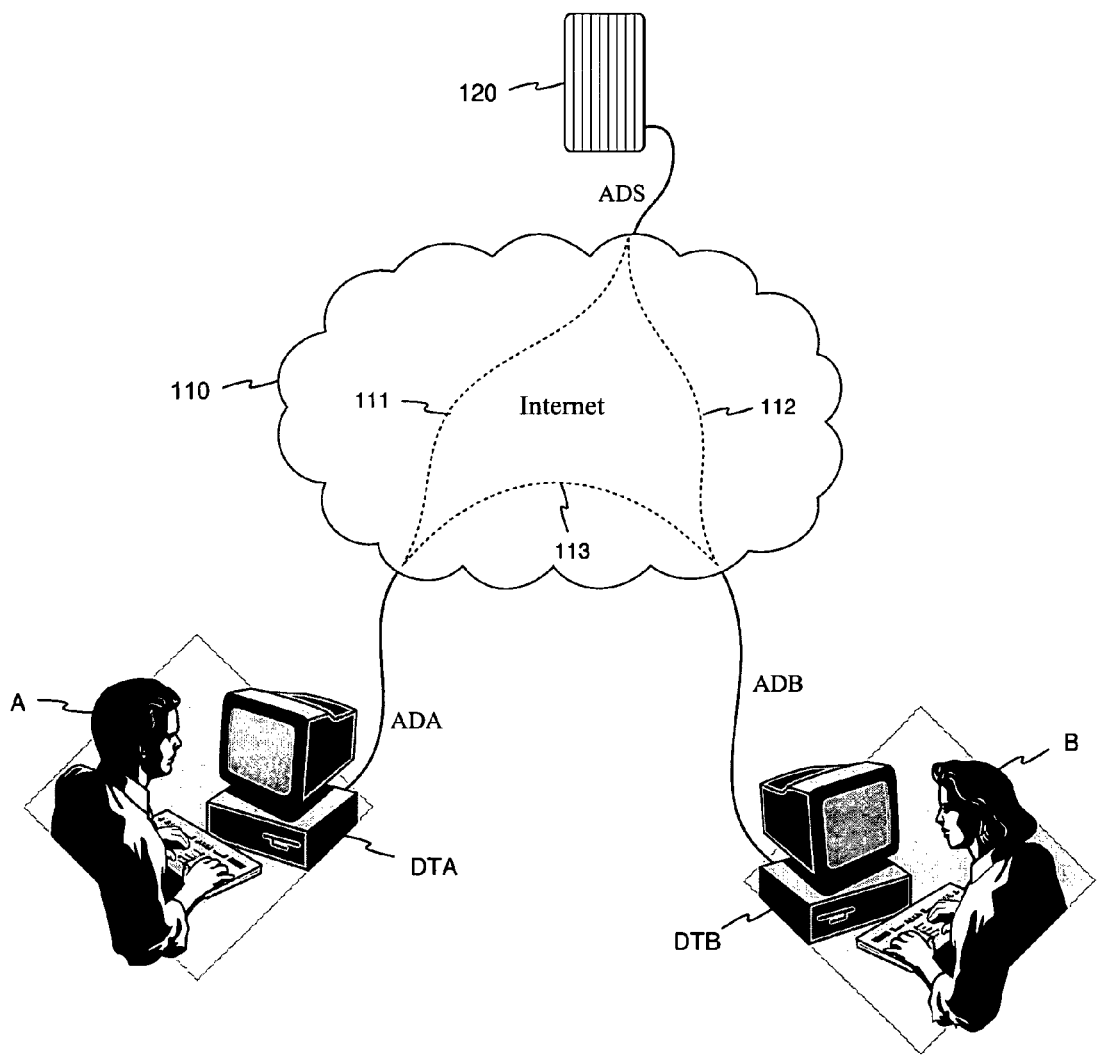
FIG. 1 shows an example of a prior-art arrangement for establishing a connection.
Figure 2:
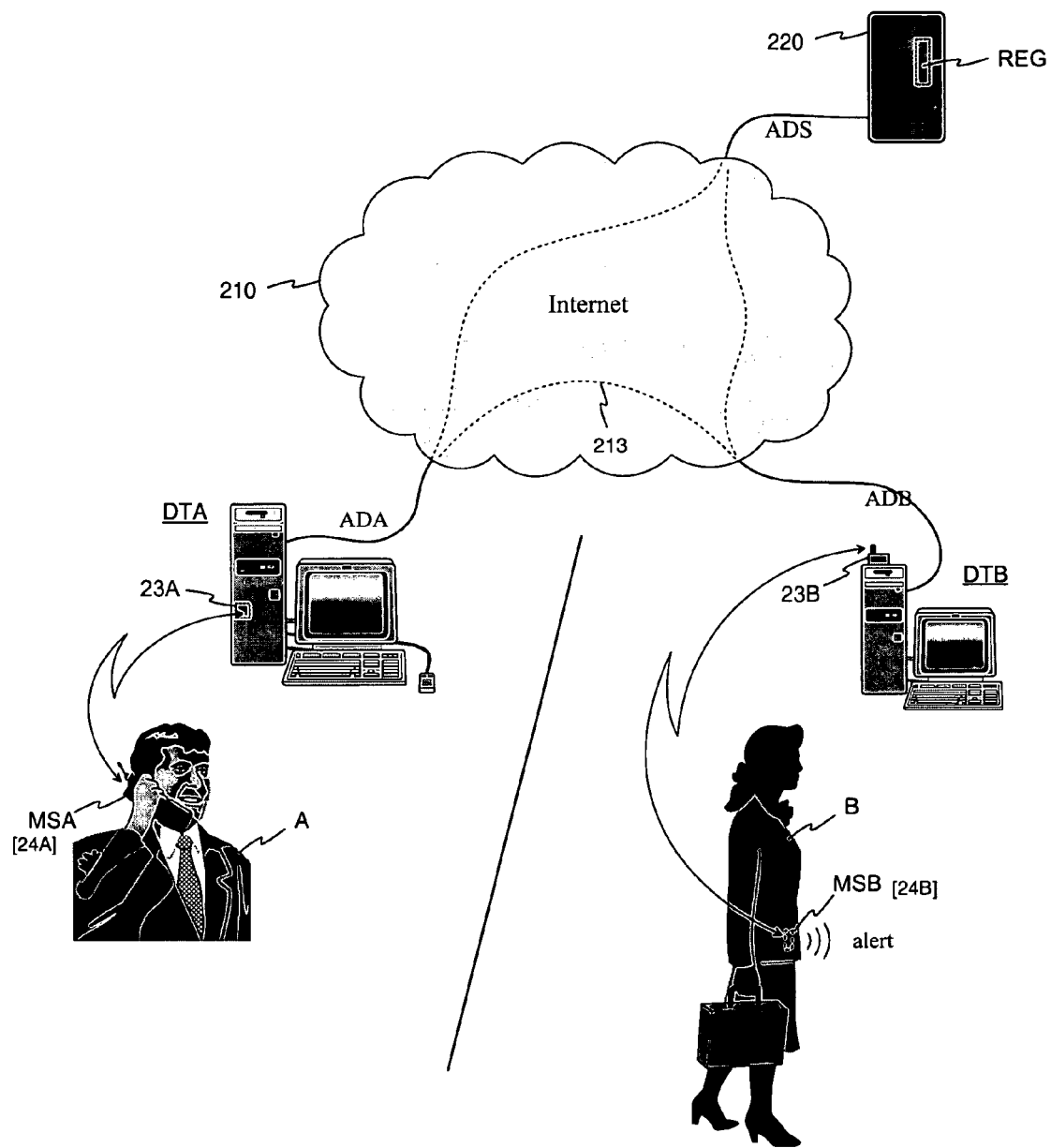
FIG. 2 shows an example of an arrangement according to the invention for establishing a connection.

FIG. 2 shows an example of an arrangement according to the invention in a connection establishment situation. In the Figure there can be seen a data network 210, in this example the Internet, with a server 220 linked thereto. The server maintains a register REG required by the connection establishing service according to the invention, which register contains communication device specific records, among other things. FIG. 2 shows two computers DTA and DTB having Internet interface with appropriate network software and IP addresses of their own. Thus they function as Internet terminals. In the vicinity of a first terminal DTA there is person A holding in his hand a first communication device MSA, which is a terminal of a mobile communication network. The first terminal DTA includes a wireless transmitter/receiver unit 23A having a relatively small operating range. Let this and corresponding units be called transceivers for short. The first communication device MSA includes a transceiver 24A operating according to the same system as the transceiver 23A in the first terminal. Transceivers 23A and 24A (and the radio path between them) constitute a digital transfer system through which the first communication device and first terminal can send messages to each other. The transceivers automatically detect a carrier according to the transfer system so that the terminal and communication device will "know" that the transfer system is up. Transmitting and receiving naturally require that both devices include an application program that provides the data to be sent to the transfer system and processes the data coming from the transfer system.

In the vicinity of the second terminal DTB there is person B with a second communication device MSB, in this example a terminal of a mobile communication network, in her pocket. In conjunction with the second terminal DTB there is a transceiver 23B which in this example is an external unit connected to the terminal computer by a cable. The second communication device MSB includes a transceiver 24B which together with the transceiver 23B in the second terminal and the radio path therebetween constitute a digital transfer system. In other respects, too, the arrangement is similar to that described above and related to the first terminal.

In the situation depicted by FIG. 2, person A is calling person B. Before that, said communication devices have automatically reported themselves to the server 220, the first communication device MSA when person A has come close enough to the first terminal DTA, and the second communication device MSB when person B has come close enough to the second terminal DTB. Software at the server has recorded the identifiers sent by the communication devices along with the fact that the first communication device is at that moment behind the IP address ADA of the first terminal and the second communication device is at that moment behind the IP address ADB of the second terminal. In the usual manner, person A has selected the name of person B in the menu of his communication device, which in this case is a mobile phone, and pressed the call button. The software at the mobile phone can be set to a state in which it first attempts to establish a connection via a data network if there exists a link to a terminal of a data network. The communication device may also include a sound or light indicator which tells the user that a data network connection is available. In that case the user can, if he or she wants, to direct the connection request, or call, to the data network manually using the keyboard or, as is the case with some communication device models, using a voice command. In the example of FIG. 2, the server has received a call containing the phone number of person B. Software at the server has checked the communication device specific record in the register and ascertained that the second communication device MSB is reachable. After that the server has for instance sent to the first terminal the IP address ADB of the second terminal, and to the second terminal the IP address ADA of the first terminal. The latter sending further includes the call containing the identification given earlier by the second communication device. The second terminal forwards the call to the second communication device, which then alerts. This stage is depicted in FIG. 2. If person B answers, a speech connection will be established via the Internet. The first and second terminals use each other's IP addresses when sending packets containing pieces of the encoded speech signal, so the packets travel via a route 213 between the interfaces of said terminals.

Figure 3:
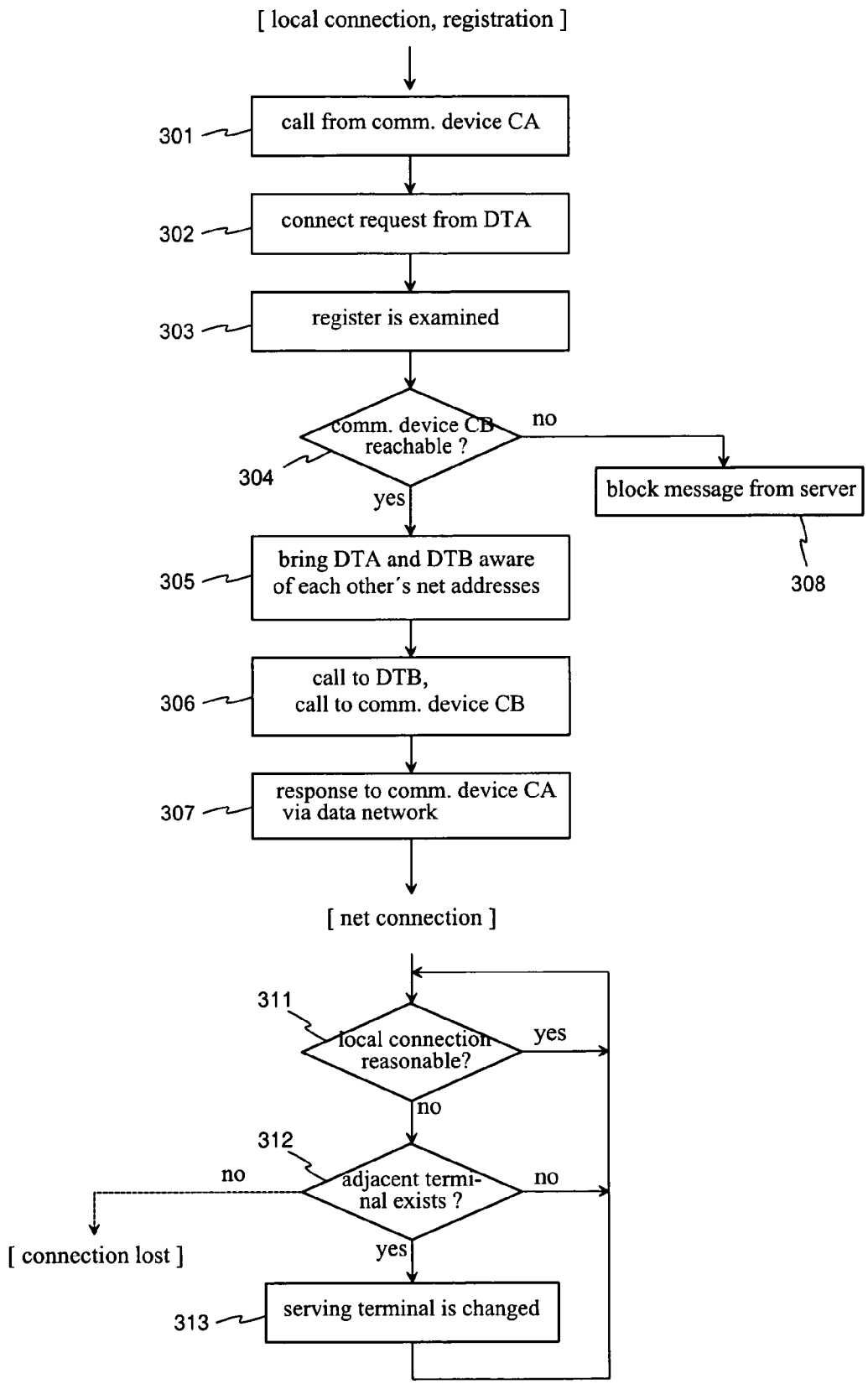
FIG. 3 shows an example of a method according to the invention for establishing a connection.

FIG. 3 provides an example of the method according to the invention in the form of a flow diagram. The situation at the beginning of the diagram is such that a data transfer link has been established between a communication device CA and a data network terminal DTA and the communication device has reported itself to data network server maintaining a register of communication devices. The reporting message sent by the communication device includes a code that usually identifies the device in question, which code may be e.g. one invented by the user, an International Mobile Equipment Identity (IMEI) code, or the phone number of the communication device. The reporting message sent by the terminal additionally includes the network address of the terminal. This is always included in the header of, say, IP packets, but if the network address is additionally included in the data field, also the application program at the receiving server will get it. In step 301 a call is sent out from a communication device CA. The call naturally contains the identifying code for the called device. This identifier may be a phone number or some other code. In addition, the call includes the identifier of the calling device CA. The call is sent via said link to terminal DTA which sends a connect request to said server, using server's network address (step 302). The connect request message includes the identifier of the called device CB and the identifier of the calling device CA or the network address of terminal DTA. In the next step 303 the server software examines the register for that part, i.e. a record, which relates to the called device CB, which record is found by the software on the basis of the identifier code in the connect request message. If the contents of the record show that device CB cannot be reached within the coverage area of any terminal, the server may send a block message to terminal DTA, steps 304 and 308. If the contents of the record show that device CB can be reached in the coverage area of a terminal DTB, the terminals DTA and DTB are brought to get each other's network addresses, steps 304 and 305. This may be done in one of three different ways: The server sends to terminal DTA a message containing the network address of terminal DTB and to terminal DTB a message containing the network address of terminal DTA. A second way is such that the server sends to terminal DTA a message containing the network address of terminal DTB, and terminal DTA then sends to terminal DTB a message containing its own network address. A third way, similar to the second one, is such that the server sends to terminal DTB a message containing the network address of terminal DTA, and terminal DTB then sends to terminal DTA a message containing its own network address. In step 306 the server sends to terminal DTB a call containing the identifier of the communication device CB, and terminal DTB forwards the call to device CB via the link between these two devices. The incoming call results in an alert in device CB, and in step 307, when the user of device CB has acknowledged the call, an answer is sent to the calling device GA. The answer message travels via the route device CB—terminal DTB—data network (routers)—terminal DTA—device GA. The server maintaining the device register is no longer needed since the data network terminals now know each other's network addresses. When the answer arrives at device CA, the data connection between the devices via the data network is ready to be used.

During a connection between communication devices the transfer system between a communication device and a terminal monitors the quality of the communications link in question. This may be based, as is well known, on monitoring the level of the carrier or the signal-to-noise ratio; the same thing which the establishment of the connection is based on initially. In step 311 of FIG. 3 the software at the terminal, for instance, decides whether the quality of the connection is satisfactory. If it is, monitoring is continued. If the connection quality shows signs of significant degradation, it is examined whether there is another data network terminal nearby that could be used for continuing the connection between the communication devices (step 312). If there is, the "old" terminal serving the communication device is replaced by a "new" one, step 313. If no new terminal is found, the process returns to step 311, i.e. an attempt is made to continue the connection using the current terminal. As the communication device moves farther away from the terminal, the link to the data network will naturally be disrupted at some point. Possibly prior to that or after that a replacement connection is established via a mobile communication network, for example.

For a change of terminals the software at the server draws conclusions about the relative locations of terminals equipped with transceivers. In a simple case, the relative locations of two terminals relatively close to each other becomes apparent from that a communication device reports itself first via one terminal and then via the other when a network connection is active via the former. Location information can also be obtained in such a manner that terminals exchange messages for that particular purpose. When such an exchange of messages is successful, a terminal can send to a server according to the invention a message containing the identifiers of the parties, primarily the network addresses, and a parameter describing the quality of the link, for example. Based on such information, server software can outline a sort of "map" of terminals eligible for connection establishment. This map can then be used in traffic management so that the server is able to prepare probable and possible changes of terminals.

Figure 4:
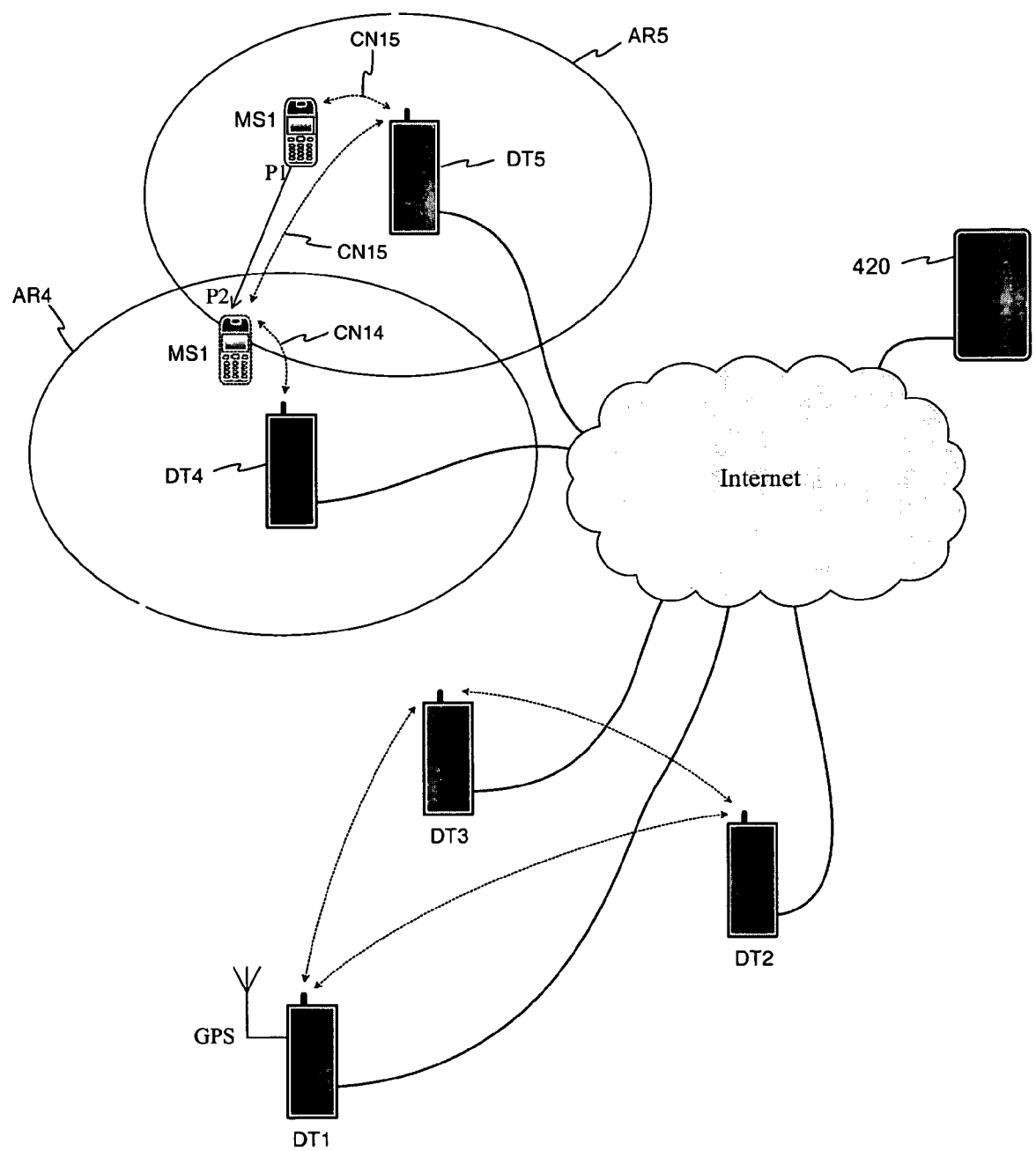
FIG. 4 shows an example of an arrangement associated with the handover between terminals.

FIG. 4 shows an example relating to the outlining of a map of terminals and exchange of terminals. This Figure shows a symbolic Internet and, in connection therewith, a server 420 according to the invention and five terminals DT1 to DT5. Terminals DT1, DT2 and DT3 are located so close to each other that they can communicate with one another using their transceivers. Terminal DT1 further includes a GPS (Global Positioning System) receiver so that it can send its coordinates to the server. Marking a geographical reference point may be useful in forming the map if there are several such reference points. Terminals DT4 and DT5 in FIG. 4 are also located relatively close to each other. The coverage areas AR4 and AR5 of their respective transceivers are partly overlapping. In area AR5, at point P1, there is a mobile station MS1 with a link CN15 to terminal DT5. The same mobile station MS 1 is depicted in broken line at point P2 which is located in the fringe area of coverage area AR5 and clearly within area AR4. If mobile station MS 1 moves to point P2, a link CN14 will be established between it and terminal DT4, and the mobile station will report to server 420 via terminal DT4. The mobile station will continue to have the link CN15 to terminal DT5. Let us assume that a call is established via connection CN15. If the server has terminals DT4 and DT5 on its map, it may have sent a command in advance to terminal DT4 so that the latter can start transferring speech signals as soon as link CN14 is established. The handover can be carried out also without such advance preparation, based on a new registration of the mobile station.

Figure 5:
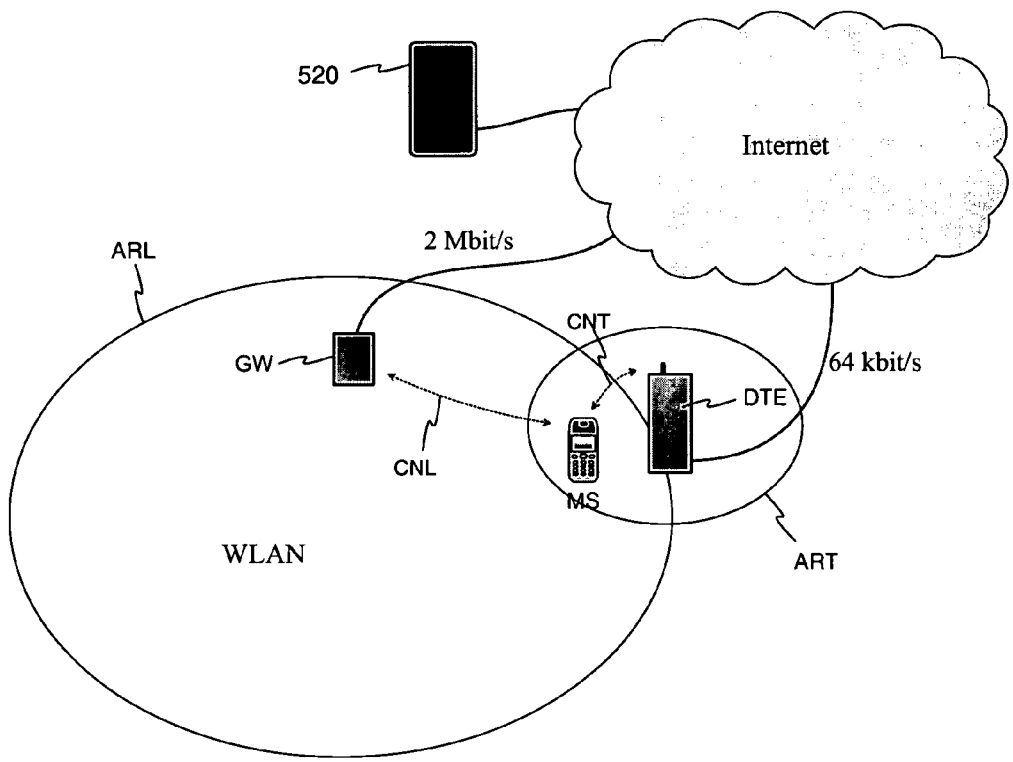
FIG. 5 shows an example of alternative routes from a communication device to a data network.

FIG. 5 shows an example of alternative routes from a communication device to a data network. The Figure shows the Internet and, interfaced therewith, a server 520 according to the invention and a terminal DTE. In addition, this example case involves a wireless local area network (WLAN), depicted by an ellipse ARL representing the operating area of the WLAN. The LAN, too, is interfaced to the Internet via a gateway GW. The coverage area ARL of the LAN and the coverage area ART of the terminal are partly overlapping. A mobile station MS happens to be located at a spot belonging to both coverage areas. If the LAN and terminal both use the same radio system, the mobile station can have both a link CNL to the LAN gateway GW and an (indirect) link CNT to the terminal DTE. Thus the gateway serves in this example as a terminal according to the invention. Let us assume for example that the transfer rate offered through the LAN to the Internet is 2 Mbit/s and the transfer rate offered through the terminal is 64 kbit/s. Software according to the invention at the server may have saved information about transfer rates of different terminals. In the case of FIG. 5 the server may intentionally choose the LAN route with the higher capacity when setting up a connection with the mobile station MS. In addition to the transfer rate, other criteria may be used as well for choosing the route, and naturally the alternative route may be something other than a LAN.

Figure 6:
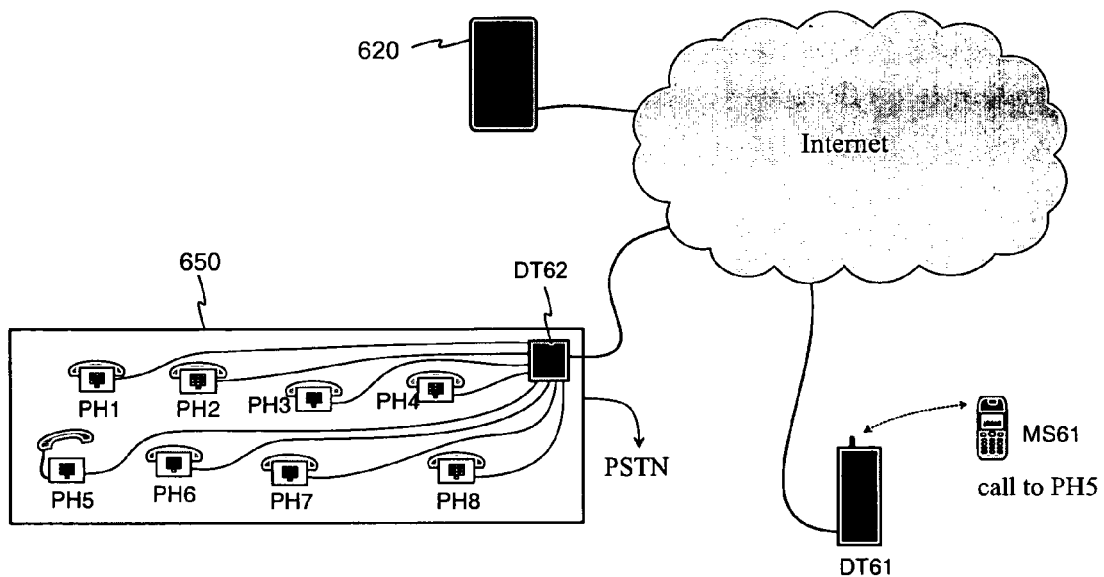
FIG. 6 shows an example of the use of fixed telephone lines according to the invention.

FIG. 6 shows an example of how fixed telephone lines can be used in accordance with the invention. The Figure shows the Internet and, interfaced therewith, a server 620 according to the invention and a terminal DT61. Additionally the Figure shows a building 650 with telephone apparatuses PH1 to PH8. These are wired in the normal manner through the house distributing center to the public switching telephone network (PSTN). In addition, the telephone apparatuses are wired to a hub DT62 which is interfaced to the Internet. The hub DT62 thus serves as a terminal according to the invention. It has sent information about the telephone extensions to the server 620. In the example, a call is placed from a mobile station MS61 located in the area of terminal DT61 to telephone extension PH5. As the server receives the connect request, it is able to inform the hub DT62 about the call. In the message to the hub, the called extension is identified as Number 5, for instance.

Figure 7:
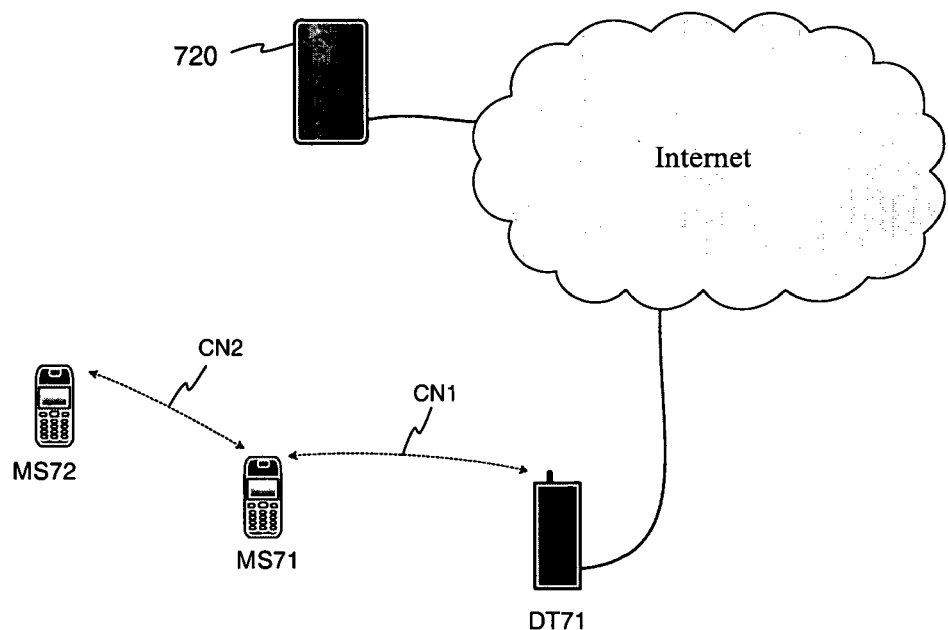
FIG. 7 shows an example of establishing a connection via several consecutive wireless data links.

FIG. 7 shows an example of connection establishment through several consecutive wireless links. The Figure shows the Internet and, interfaced therewith, a server 720 according to the invention and a terminal DT71. In the coverage area of the terminal, there is a mobile station MS71 with a link CN1 to the terminal DT71. Additionally there is a second mobile station MS72 which is out of reach of all terminals according to the invention. However, said mobile stations are so close to each other that a link CN2 is established between them. The software in the mobile stations is compiled such that the mobile stations can serve as relay stations. Thus, when a call addressed to a communication device arrives from mobile station MS72, mobile station MS71 forwards this call to terminal DT71. Once a network connection to the called device has been established, mobile station MS71 also forwards the packets to and from mobile station MS72 during the connection.

Figure 8:
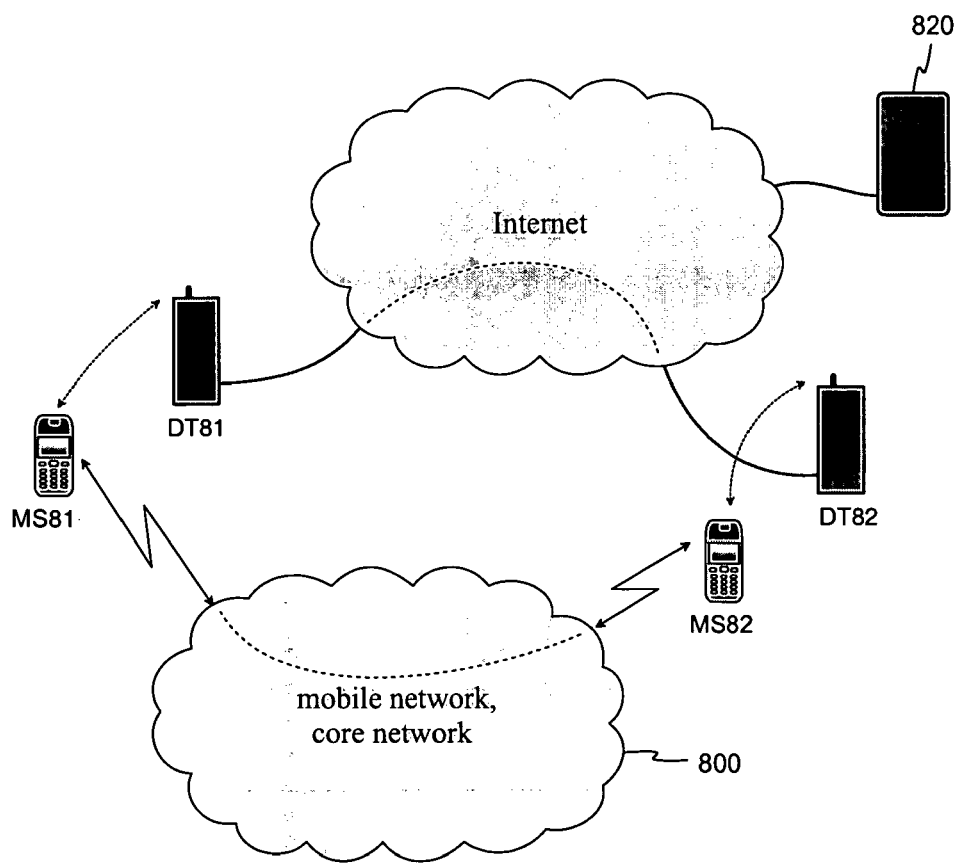
FIG. 8 shows an arrangement enabling a data network and mobile communications network to be used in combination.

FIG. 8 shows both the Internet and a network 800 dealing with mobile traffic, which network includes radio access networks and a fixed core network. In the example of FIG. 8 there is a mobile station MS81 having a link to an Internet terminal DT81 according to the invention, and a second mobile station MS82 having a link to a terminal DT82 according to the invention. In addition, the mobile stations exchange signaling messages with the mobile network 800 in the normal manner. As was mentioned earlier, when mobile station MS81, for instance, calls mobile station MS82, connection establishment may be first attempted via a data network, which in this example, too, is the Internet. If such a connection cannot be established, the server 820 sends out a message to that effect, and mobile station MS81 naturally then places a normal call to the mobile network. The mobile stations may also be arranged so as to shift the connection over to the mobile network if a connection can be established via the Internet but the connection quality becomes unacceptable either within the Internet or in either of the local links. Furthermore, the mobile network can always be used otherwise, too. It can be used e.g. to establish short-term connections for establishing an Internet connection or for transferring usage data. Information to be transferred may also be divided during a session: Transfers requiring relatively low capacity such as the transfer of a speech signal, are made via the mobile network. Transfers requiring a relatively high capacity such as the transfer of live pictures and large data files and transfers requiring high data integrity, are made via the data network.

Figure 9:
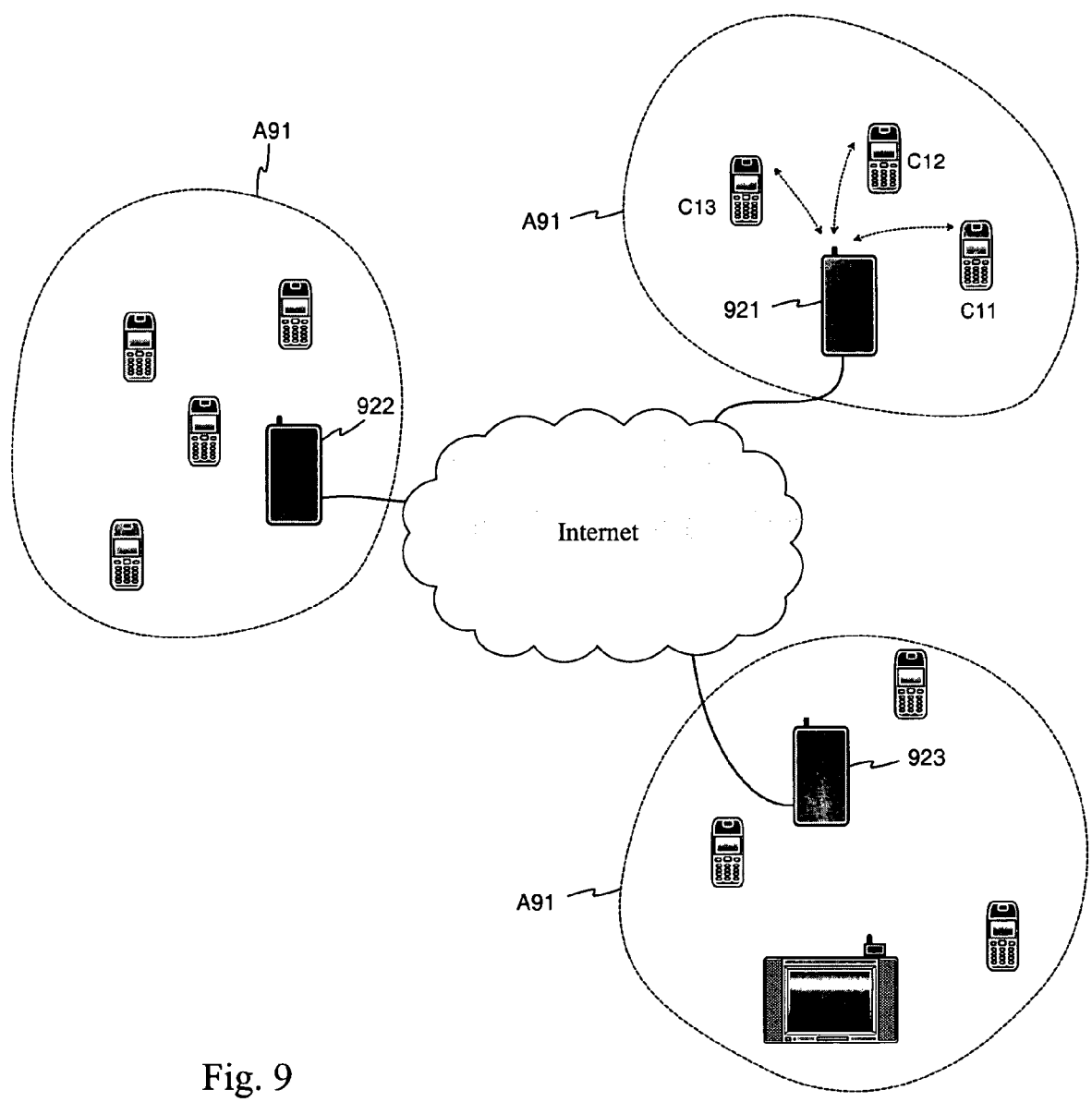
FIG. 9 shows a distributed server architecture according to the invention.

FIG. 9 shows a distributed server architecture. Therein the server functions are distributed in data network terminals according to the invention. Thus there are not necessarily terminals that are just terminals; the terminals are at the same time servers. The Figure shows the Internet and, interfaces therewith, three servers 921, 922 and 923. Each server has a certain coverage area within which wireless communication devices can establish data links to the server. For example, communication devices C11, C12 and C13 are located in the coverage area A91 of server 921. The server primarily manages traffic within its own area. Should a call from a communication device be addressed to a communication device farther away, the server in question can send to the other servers an inquiry about whether the called device has registered itself anywhere. In one area A91 there is among the communication devices a video terminal VD for receiving relatively high-quality video and audio.

Above in conjunction with the description of FIG. 8 was mentioned the use of a mobile network in establishing an Internet connection. Let us assume that a communication device C11 in the area of server 921 in FIG. 9 calls a communication device C25 in the area of server 922. The connection is first established through a mobile network. Using this connection, device C11 sends the network address of server 921 to device C25, which in turn sends it further to terminal 922. Similarly, device C25 sends the network address of server 922 to device C11, which in turn sends it further to terminal 921. After that, the servers can carry out the transfers of data packets to the appropriate addresses just like terminals.

Examples of the system according to the invention were given above. The invention is not limited to those examples. A communication device may be any apparatus that has a unique identifier and a suitable transceiver. Such an apparatus may be e.g. a cordless telephone attached to a wireline extension. A transceiver may be an external component to a communication device associated therewith. Transceivers utilize Bluetooth technology, for example. They may also be in accordance with some other radio system, or the transfer system based on them may be an infrared link. A terminal may be a dedicated processor-based device or e.g., a PC workstation equipped with special hardware and software. A terminal may also be an apparatus in the category of entertainment electronics, such as a so-called set-top box for digital TV, equipped with a data network interface. Units participating in connection establishment can be equipped with programs utilizing known encryption methods in order to enhance information security. Furthermore, converted network addresses can be used instead of real ones. The way of conversion is known only to the server and the terminal in question. Moreover, the network address can be altered in a pre-determined manner according to the time of the day, for example, so that potential tracking attempts by outsiders become even more difficult.

The invention claimed is:

1. An arrangement for establishing and maintaining a connection between communication devices via a data network, comprising:
   at least one server interfaced with the data network and data network terminals having network addresses, said server keeping a communication device register, a communication device and a terminal being arranged to establish a data transfer link between each other, wherein
   the communication device is arranged to report by sending via said data transfer link an identifier, as well as to send a call via said data transfer link,
   the terminal is arranged to send to the server the identifier received from the communication device and at the same time a network address of the terminal, and to notify the communication device about a call received from the server,
   the server has the communication device register for storing identifiers of reported communication devices and network addresses of terminals for the purpose of finding out reachability of the communication devices,
   the server is arranged to send network address of the terminal to another terminal in order to establish a network connection between the terminals, and
   the server is arranged to draw conclusions about relative locations of terminals for making the handover between the terminals during the connection between the communication devices, in which at least one communication device is a mobile terminal.

2. The arrangement according to claim 1, said terminal being a PC-type computer.

3. The arrangement according to claim 1, said terminal being a hub.

4. The arrangement according to claim 1, said terminal being a device in the category of entertainment electronics.

5. The arrangement according to claim 1, wherein, for said data link, both the terminal and the communication device have short-range wireless protocol units.

6. The arrangement according to claim 1, wherein, for said data link, the communication device has a transceiver unit according to a wireless LAN technology.

7. The arrangement according to claim 1, said data network being the Internet.

8. The arrangement according to claim 1, said identifier being a telephone number associated with the communication device.

9. The arrangement according to claim 1, said identifier being an IMEI (International Mobile Equipment Identity) code of the communication device.

10. The arrangement according to claim 1, said identifier being a code chosen by a user of the communication device.

11. The arrangement according to claim 1, at least one terminal being arranged to give geographical coordinates of the terminal to the server in support of said conclusions about relative locations of terminals.

12. The arrangement according to claim 1, said communication devices being telecommunication network terminals and the communication devices being arranged to use a telecommunication network to establish a data network connection.

13. The arrangement according to claim 12, wherein an establishing of said data network connection comprises a transfer of network addresses of the data network terminals via said telecommunication network.

14. The arrangement according to claim 1, at least one terminal being at the same time the server.

15. A method for establishing and maintaining a connection between a first and a second communication device via a data network interfaced with at least one server keeping a register of communication devices, and terminals having network addresses, said first communication device has a data link to a first terminal, and in which method identifiers sent by the terminals, referring to users of the communication devices, and said network addresses of said terminals are stored in the server's register, the method further comprising:
   a call addressed to the second communication device is sent from the first communication device to the first terminal,
   a connect request is sent from the first terminal to the server on the basis of said call,
   reachability of the second communication device is examined on the basis of information stored in the register of the server,
   the first and second terminals get each other's network addresses through the at least one server if the second communication device can be reached through said second terminal,
   the call addressed to the second communication device is sent from the server to the second terminal,
   said call is further sent from the second terminal to the second communication device,
   an answer to the call is transferred from the second communication device to the first communication device via a route: second terminal, data network, first terminal, first communication device, and
   relative locations of terminals are determined by the at least one server for making a handover between terminals during the connection between the communication devices.

16. The method according to claim 15, wherein said handover from the terminal serving a communication device is made if the quality of the data link between the two devices drops down to a predetermined level and there exists according to the information stored at a server another terminal through which the connection between communication devices can be maintained.

17. The method according to claim 15, wherein, to provide the network addresses to the terminals, the network address of the second terminal is sent from the server to the first terminal, and the network address of the first terminal is sent from the server to the second terminal.

18. The method according to claim 15, wherein, to provide the network addresses to the terminals, the network address of the second terminal is sent from the server to the first terminal, and the network address of the first terminal is sent from the first terminal to the second terminal.

19. The method according to claim 15, wherein, to provide the network addresses to the terminals, the network address of the first terminal is sent from the server to the second terminal, and the network address of the second terminal is sent from the second terminal to the first terminal.

20. The method according to claim 16, said information stored at the server for making the handover between terminals comprising a map of locations of the terminals.

21. The method according to claim 15, said network addresses being altered to make external tracking more difficult.

22. The method according to claim 21, the way to alter said network addresses being varied according to a time of the day.

* * * * *

UNITED STATES PATENT AND TRADEMARK OFFICE
CERTIFICATE OF CORRECTION

PATENT NO. : 7,711,823 B2 Page 1 of 1
APPLICATION NO. : 10/468353
DATED : May 4, 2010
INVENTOR(S) : Vesa J. Hukkanen It is certified that error appears in the above-identified patent and that said Letters Patent is hereby corrected as shown below:

In column 1, line 3, below "Title" insert
-- CROSS REFERENCE TO RELATED APPLICATION This application is the U.S. National Phase filling under 35 U.S.C. §371 of PCT/FI02/00133, filed Feb. 18, 2002, which claims benefit of Finland Patent Application No. 20010297, filed Feb. 16, 2001, which applications are incorporated herein by reference. --.

In column 6, line 12, delete "GA." and insert -- CA. --, therefor.

In column 6, line 14, delete "GA." and insert -- CA. --, therefor.

Signed and Sealed this

Thirteenth Day of July, 2010

David J. Kappos
*Director of the United States Patent and Trademark Office*